United States Patent
Lindelof et al.

(10) Patent No.: US 8,747,588 B1
(45) Date of Patent: *Jun. 10, 2014

(54) PROTECTED PRONG FILE FASTENER AND METHOD OF MAKING

(75) Inventors: Harold Peter Lindelof, Eden Prairie, MN (US); Marvin J. Halfen, Hastings, MN (US); David J. Gilbertson, Hastings, MN (US)

(73) Assignee: Smead Manufacturing Company, Hastings, MN (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/227,687

(22) Filed: Sep. 8, 2011

Related U.S. Application Data

(60) Provisional application No. 61/380,854, filed on Sep. 8, 2010.

(51) Int. Cl.
  *B29C 63/42* (2006.01)
  *B29C 63/00* (2006.01)
  *B29C 63/44* (2006.01)

(52) U.S. Cl.
  CPC ............. *B29C 63/42* (2013.01); *B29C 63/0069* (2013.01); *B29C 63/44* (2013.01)
  USPC .................................. 156/86; 156/84; 156/85

(58) Field of Classification Search
  CPC .... B29C 63/0069; B29C 63/42; B29C 63/44; H01R 43/00
  USPC ................................................ 156/84, 85, 86
  See application file for complete search history.

(56) References Cited

U.S. PATENT DOCUMENTS

| | | | |
|---|---|---|---|
| 3,896,528 A | 7/1975 | Abeles | |
| 4,269,530 A | 5/1981 | Weber | |
| 4,437,781 A | 3/1984 | Weihe et al. | |
| 4,519,504 A | 5/1985 | Nausedas | |
| 4,869,613 A | 9/1989 | Corey | |
| 5,037,228 A | 8/1991 | Karlin | |
| 5,059,051 A * | 10/1991 | Corey | 402/75 |
| 5,096,323 A | 3/1992 | Walker | |
| 5,213,429 A | 5/1993 | Johnson | |
| 5,236,226 A | 8/1993 | Sheffield | |
| 5,257,870 A | 11/1993 | Bennett et al. | |
| 5,593,242 A | 1/1997 | Mathias | |
| 5,785,444 A | 7/1998 | Matsuura | |
| 5,862,579 A | 1/1999 | Blumberg | |
| 6,168,337 B1 | 1/2001 | Adams | |
| 6,565,277 B1 | 5/2003 | Huang | |
| 7,234,886 B2 * | 6/2007 | Tuozzo | 402/19 |
| 8,414,211 B1 * | 4/2013 | Lindelof et al. | 402/14 |
| 2010/0316435 A1 * | 12/2010 | Gilbert | 402/39 |

* cited by examiner

*Primary Examiner* — Katarzyna Wyrozebski Lee
*Assistant Examiner* — John Blades
(74) *Attorney, Agent, or Firm* — Altera Law Group, LLC

(57) ABSTRACT

A prong style file fastener, and method of manufacturer, is disclosed which has a protective element to prevent damage to paper documents and personal injury. In one embodiment, the prongs of the fastener is covers with a heat shrinkable sheath. In another, the prongs are overcoated with a powder coating which is melted thereon. A method of applying the sheath to the prongs uses a pair of jaws to drive the sheath onto the prongs. In the case of the powdercoat covering, the production line uses a cam drive sprocket retractor to release the line onto a takeup.

12 Claims, 19 Drawing Sheets

US 8,747,588 B1

PROTECTED PRONG FILE FASTENER AND METHOD OF MAKING

BACKGROUND

1. Field of the Disclosure

The present invention is directed to the field of paper document management, and more particularly to file fasteners having bendable prongs.

2. Description of the Related Art

Paper fasteners have been used for decades to bind paper documents into file folders. They are typically formed from a base plate with two orthogonal prongs extending from the ends of the base plate and which are themselves bendable.

In the most prevalent configuration, the fastener also includes a compressor plate which is used at the end of the prongs to provide a secure lock on the prongs.

These prior art devices have at least two serious deficiencies. First, they have sharp metal edges which shear the papers they are intended to bind and second, these same sharp edges can cause injuries.

A solution to these problems would be to dull or roll (coin) the edges. This does not seem to work at least with respect to the first problem. The mere nature of metal edges, dull or not, causes papers to become detached by ripping or shearing. Use of plastic prongs has likewise not worked well. The plastic is either too elastic or too rigid which causes cracks and failures.

The present invention provides multiple solutions to this dilemma.

BRIEF SUMMARY

A protected pronged file fastener is disclosed having a longitudinal base element having first and second ends, a pair of prongs each extending from each end of the base element, said prongs being bendably attached thereto, and a non-metallic sheath overcoating covering a substantial portion of each prong.

The fastener may also have a sheath of flexible tubular member heat shrunk on the prongs.

The fastener may also have prongs and tips, the prongs being tapered from the tip to a point between the tip and the end connected to the base.

The fastener may also have prongs that include a tip and are tapered from the tip to the base.

There is also a method of making a protected file fastener having a pair of prongs having proximal and distal ends, comprising any of the steps of inserting a length of heat shrinkable tubing on the proximal end of the prong, engaging the tubing with a pair of jaws and driving the tubing on to the prong until an end thereof reaches the distal end of the prong, applying heat to the tubing.

The method may also include making electostatically charging a plurality of fasteners which are joined together in a line; spraying meltable powder coating onto the line from below; heat treating the line to melt the powder into an overcoating.

The method may also include a line of prong fasteners which include a sprocket drive at its beginning and take up end, further including the steps of on the take up end engaging the line on a sprocket drive having moveable sprockets; retracting the sprockets on the drive after the line has been rotated only a portion of a turn on the sprocket drive, so that the line is removable from the sprocket drive.

The method may also include the step of engaging the sprockets in a channel on a drive wheel, the channel being a cam and wherein the sprockets are retracted in response to the curvature of the cam.

There is also a protected pronged file fastener having a longitudinal base element having first and second ends; a pair of prongs one each extending from each end of the base element, said prongs being bendably attached thereto, and a non-metallic sheath powder coating melted on a substantial portion of each prong.

The summary provided is intended to help the reader understand some aspects of the invention. The scope of the invention is defined by the claims as read with the specification and cannot be determined by this summary.

DETAILED DESCRIPTION OF THE INVENTION

Pronged fasteners are used primarily to attach documents into folders. They provide the advantage over ringed binders in that they are very compact and can adapt to varying thicknesses of documents and remain compact.

An early example of such a binder is found in U.S. Pat. No. 1,978,569 to Dayton dating back to 1934. For 75+ years, this has remained the dominate form of prong binder such as shown in the commercial product. Modifications of the concept such as U.S. Pat. No. 2,477,417 to Pitt worked with the compressor concept but the basic metal base two prong bendable binder is still the standard of the industry today. Even in 1992, patents were being granted on variations of the same product which suffers from the same defects as the original product (see U.S. Pat. No. 096,323 to Walker).

All of the prior devices suffer from two severe defects. First, they have sharp metal edges which shear the papers they are intended to bind and second, these same sharp edges can cause injuries. Thus, there has been a long felt need to solve both of these problems in an economical way, without losing the functionality of the prior art devices. Despite decades of attempts to develop a suitable alternative which was economically feasible, until now, the solution has eluded the efforts of others.

The present invention solves both of the above mentioned problems as well as an additional problem (metal fatigue from repeated bending of metal tangs), while maintaining a cost effective solution.

In one embodiment the as shown in FIGS. 1, 2, 3A, 3B, 4, 5, 6 and 7, a two prong binder 10 is shown. The version shown is a "bonded" type, meaning it is self contained and can be affixed to a file folder without punching the folder. The bonding feature is known in the art such as in Smead® Manufacturing Company product part number 24600. It is also possible to use the inventive features herein with other mechanisms for attachment to files, but as punching holes for the prongs to pass and riveting the base. (Smead® product 35511 or 11537, all of the named product being hereby incorporated by reference.)

Figure 7:
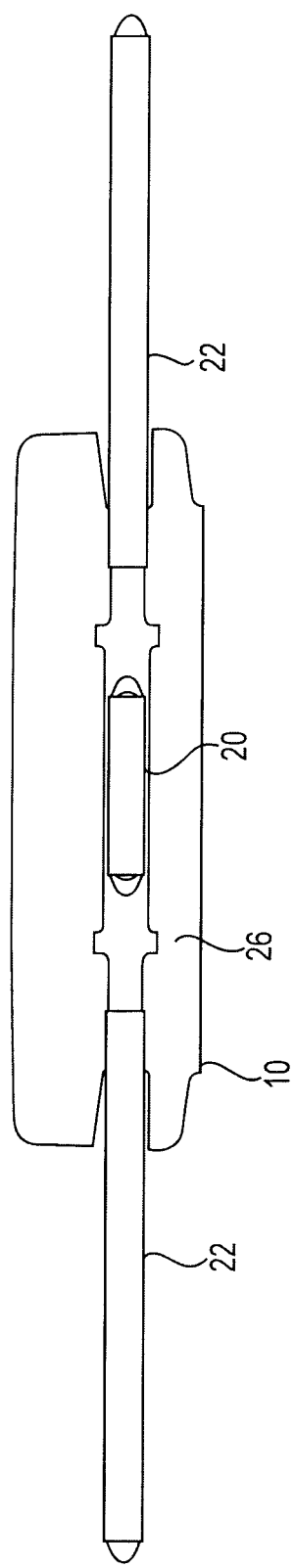
FIG. 7 is top plan view of the system in FIG. 4.

As seen most clearly in FIG. 7, binder 10 has a longitudinal base section 20, with bendable prongs 22 extending from both ends thereof. In this embodiment, the base is affixed to a fixation base 26 of fiber material which itself is then bonded to a file folder or the like, by adhesive.

Figure 1:
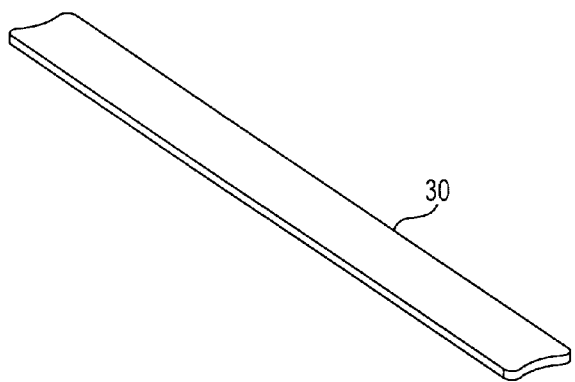
FIG. 1 illustrates a perspective view of a sheath.
Figure 2:
FIG. 2 is a plan view of the sheath in FIG. 1.
Figure 3A:
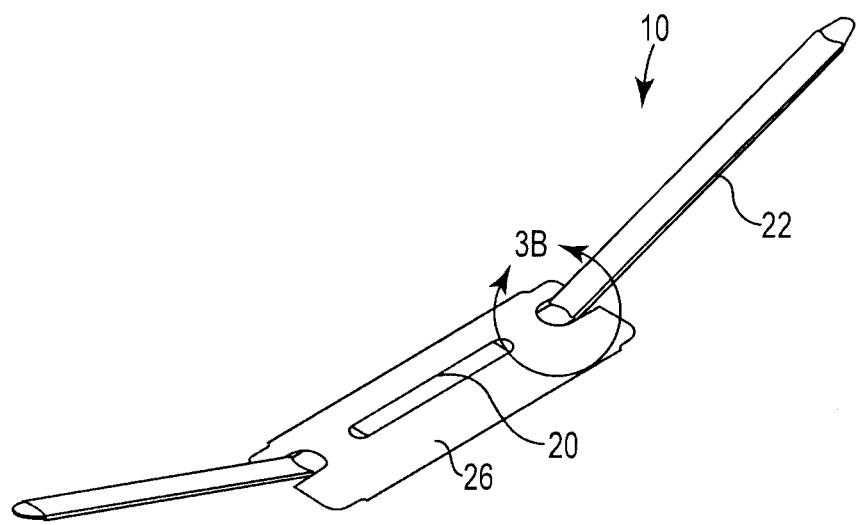
FIG. 3A is a perspective view of a prong clasp system according to one embodiment.
Figure 3B:
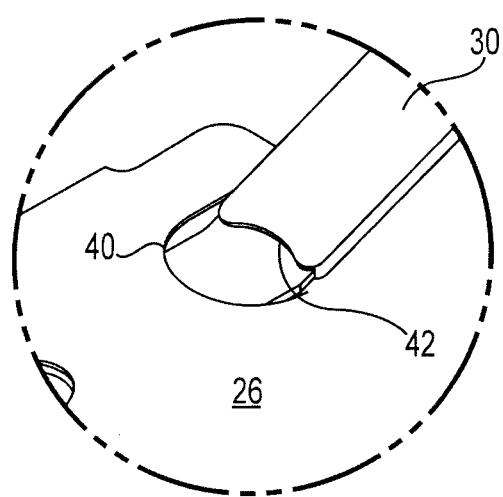
FIG. 3B is a close up fragmentary view of a portion of FIG. 3A.
Figure 4:
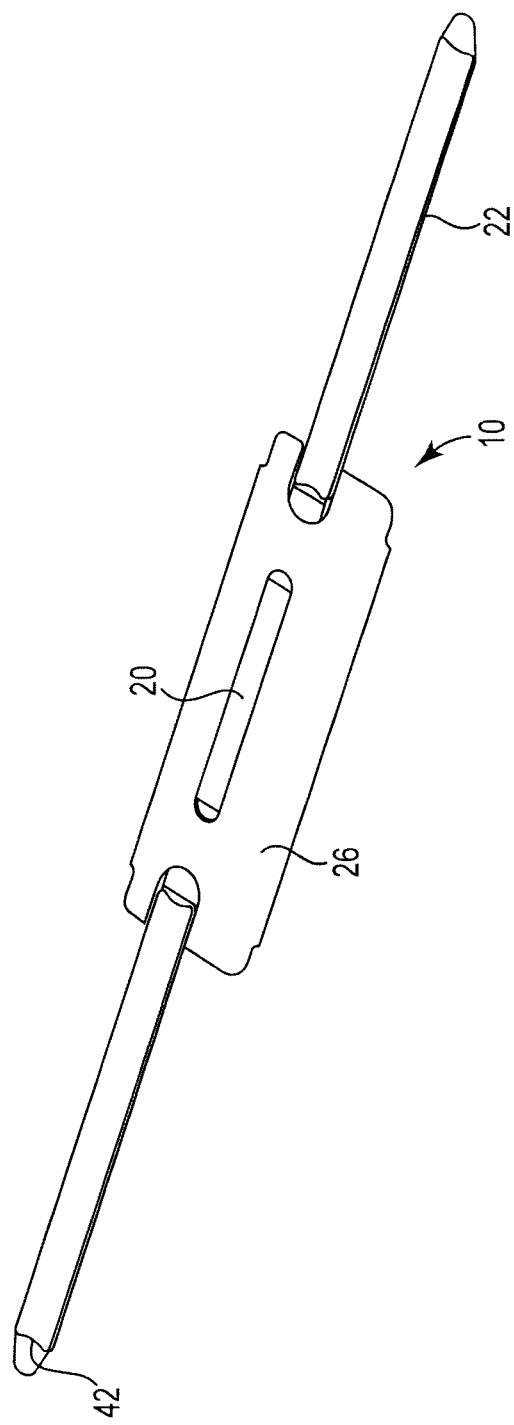
FIG. 4 is a perspective view of a clasp system.

In this embodiment, the tang 22 is overcoated by a flexible material 30 which is shown alone in FIGS. 1 and 2. The preferred material is a heated shrinkable tubing of a type known in the art for electrical insulating applications such as 3M part IMCSN medium wall heat shrink tubing or similar products from Thermafix® product sold at www.shrinkshop.com. Such products typically have a 2:1 heat shrink ratio though other ratios may be acceptable.

Heat shrink tubing does not come flat as shown, but is supplied in a tubular format typically on long spools. The product is semi-rigid but not so rigid that it is easily inserted onto prong/tang 22 of the clasps 10. The method of manufacture which also forms a portion of this invention is detailed below.

To achieve the goals, of 1) safety against injury by laceration, 2) avoiding shearing of documents at their punch holes 3) metal fatigue caused by multiple bends to the metal tang and 4) creating wavy tangs from multiple bends in different places along its length as the document stack changes, by overcoating the tang with flexible non-shearing/cutting material, each of these problems is eliminated.

In particular, the tang 22 is fitted with a heat shrinkable sheath portion 30 which is then shrunk to engage the tang such that it cannot be removed. At the same time, the sheath protects both the user and the paper from cuts by occluding the sharp edges of the tang. Likewise, the bending radius of the tang is now reduced by virtue of the triple layered constructions (metal bounded by two layers of sheath). This prevents the tangs from kinking (becoming wavy and difficult for punched document papers to be inserted) and breaking from over bending. The increased bending radius is particularly helpful in avoiding damage to punched holes as there are no sharp bends in the tang at the point of contact with the paper at its weakest point (holes).

The prior art construction of the tang is not preferred for this new system. In the prior art, the tang has parallel sidewalls to its tip. In the preferred embodiment, the sidewalls 22a-b (see FIG. 6) are tapered so that they can accommodate insertion of the sheath 30 without snagging. This becomes important in high speed manufacturing because the sheath is not highly rigid, and if of low quality will not be perfectly cylindrical.

Figure 5:
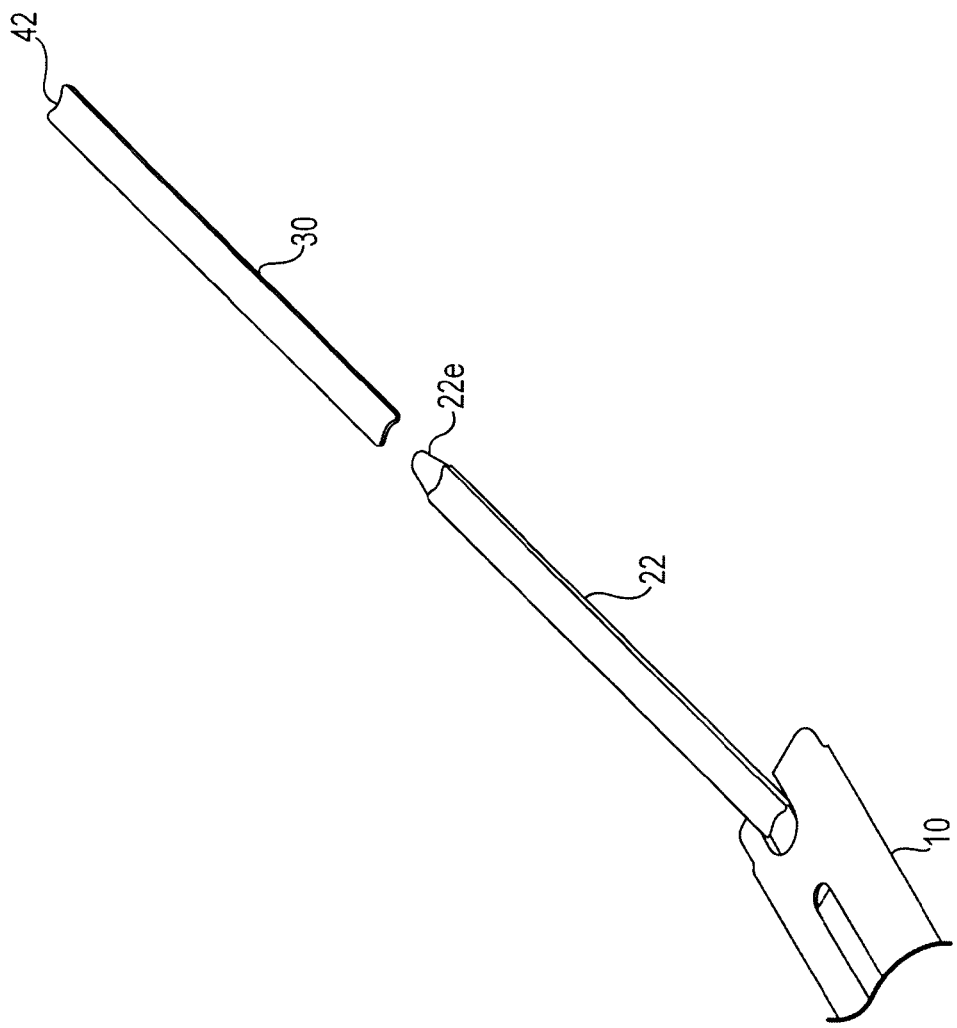
FIG. 5 is a fragmentary view of FIG. 4 with the sheath shown inserted and before insertion with a broad tip.
Figure 6:
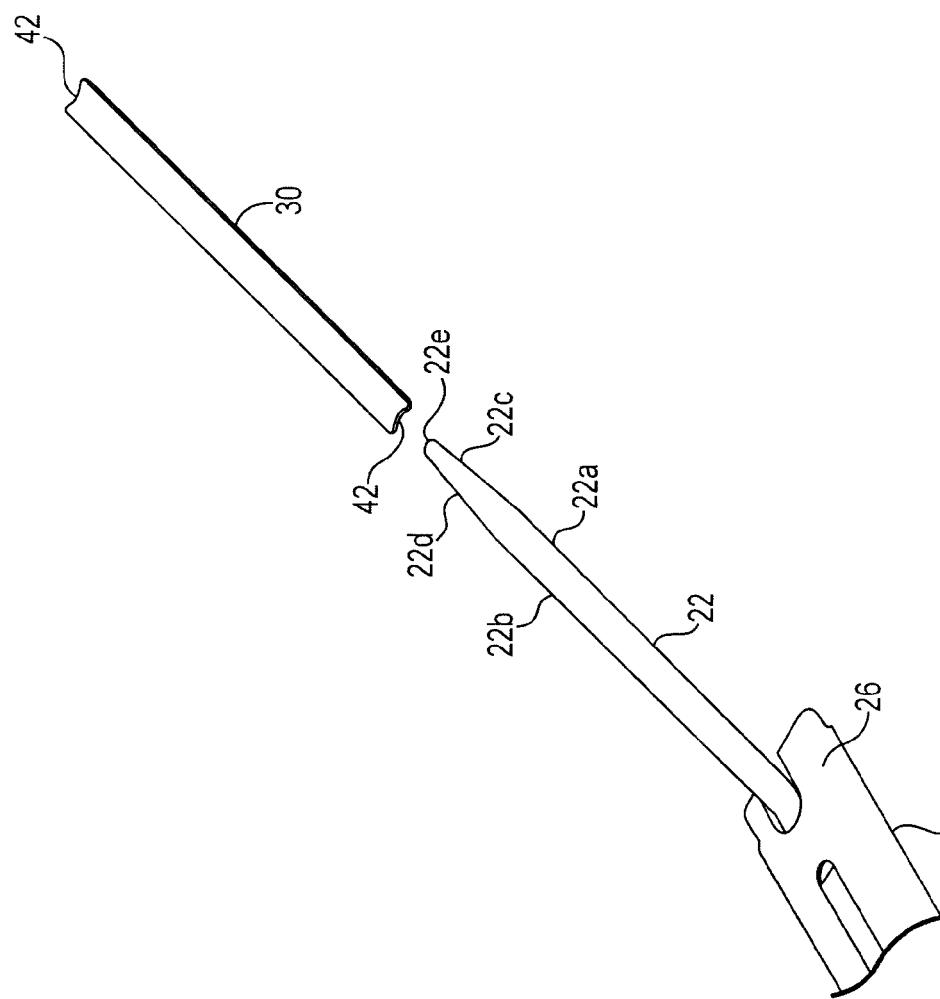
FIG. 6 is a view like FIG. 5 with the sheath before insertion with a narrow tip.

The tip in FIG. 5 is tapered, but in FIG. 6. is highly tapered for the same reasons as the body 22a-b is tapered. The taper 22c-d is more highly taped than the body 22a-b. This allows for easy insertion of the sheath, but does not result in an overly thin tang body which would degrade performance.

The preferred terminations for the sheath 30 are as follows: For the tip/distal end, the heat shrinkable sheath should terminate at a point on the top 22e where the total width (underlying base material+thickness of the sheath) is at least 10% less than the maximum width of the tang overcoated with heat shrinkable sheath/tubing. Alternatives would be 15%, 20%, 25% or more. The goal is to avoid snagging of the tip. By increasing the taper, the overcoating is less likely to snag. If the sheath 30 extends into the hole, the snagging risk is virtually eliminated.

At the proximal end the overcoating should preferably extend to contact or at least be adjacent to the base material 26 so that papers will not snag on their removal. The preferred extent would be close enough to the base that no single leaf of paper can fit therebetween.

When the heat shrinkable tubing is cut from a continuous spool, it can be simply cut orthogonally, or with a slight concavity 42. This can provide further resistance to snagging especially at the tip because the cut away portion (concavity) might otherwise cause slight bunching when shrinking.

Figure 8:
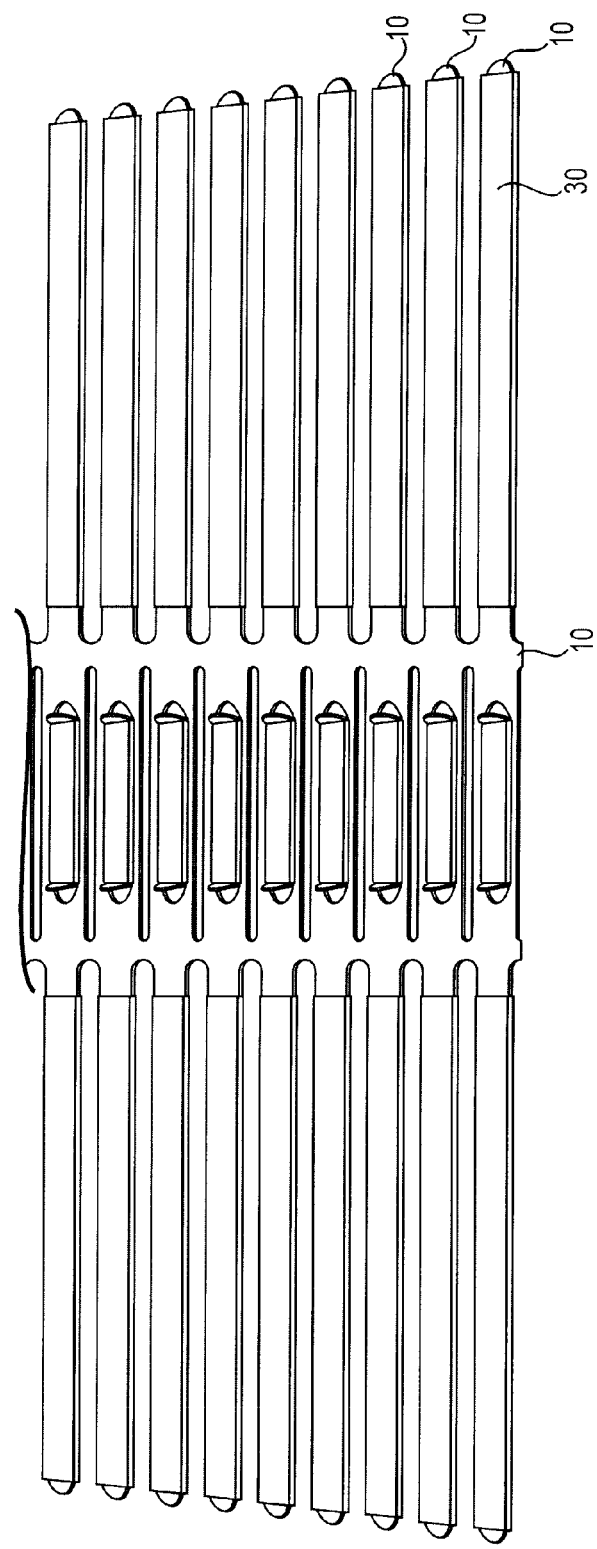
FIG. 8 is a perspective view of a plurality of prong clasps before cutting into separate clasps.

FIG. 8 illustrates a plurality of clasps 10 connected in a serial strip as produced by a punching machine. It is preferable to produce claps 10 in a continuous strip in order that they can be fitted with a sheath by automated machines.

FIGS. 9, 10, 11, 12, 13 and 14 show production machines for assembly of sheath covering onto tangs 22.

There are multiple complications with the manufacture of sheath protected tangs. First, is the fact that the sheath material must be relatively thin to allow the increased width of the tang which the sheath creates and the fixed size of the standard hole punch. The international standard hole diameter is 5.5-6.5 mm (¼ inch) spaced 70 mm apart.

Figure 11:
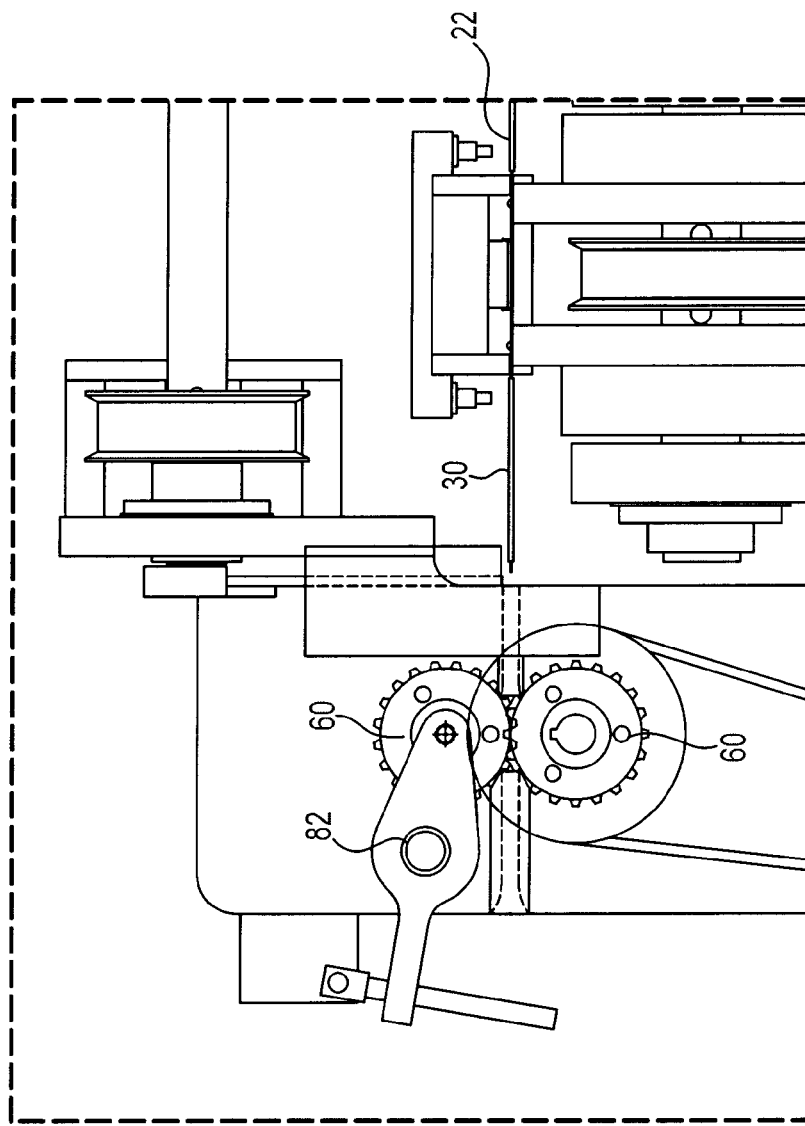
FIG. 11 is a side plan view of the machine in FIG. 9.
Figure 12:
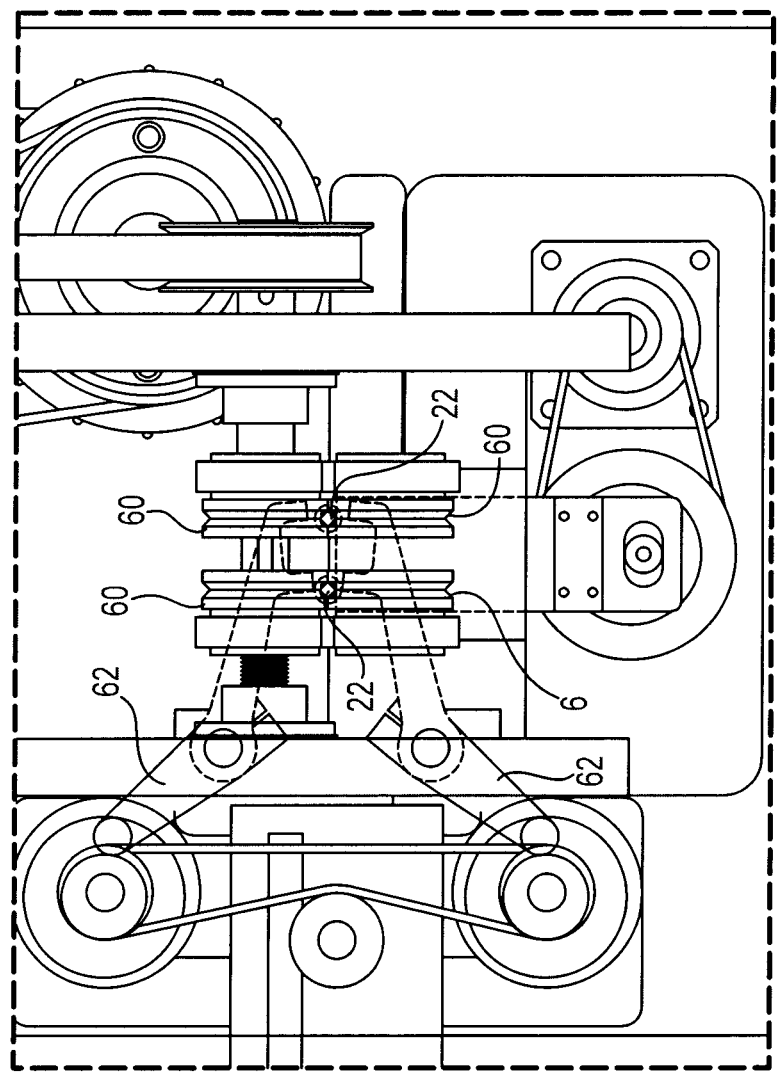
FIG. 12 is a top plan view of FIG. 11.
Figure 13:
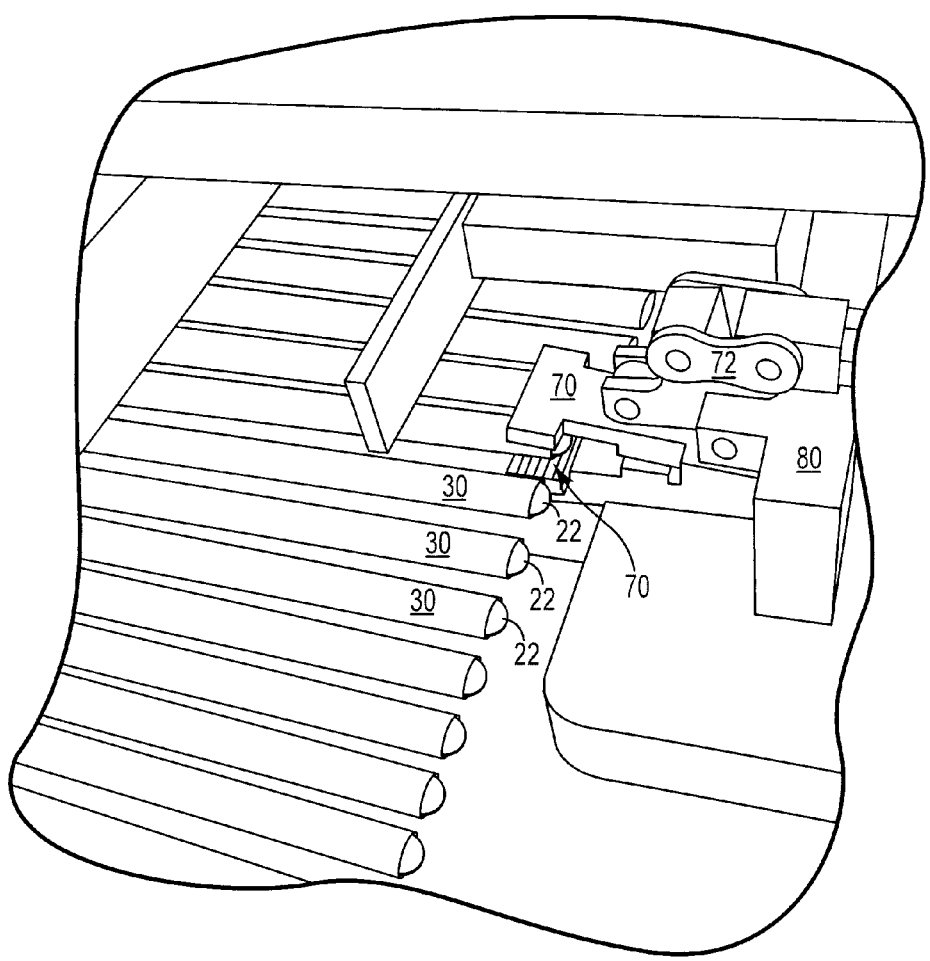
FIG. 13 is a perspective view of the machine in FIG. 9.

FIG. 11 illustrates a plurality of tangs 22 seen in side view. A pair of mating pinch rollers 60 (see FIG. 12) with V-shaped or concave recesses to capture and feed the shrink tubing off a spool. In FIG. 12 two sets of paired feed rollers 60 are shown so that two tangs can be fitted with sheath simultaneously. Reciprocating arms 62 operating off a cam, move into and out of position as the cam rotates and transmits reciprocating motion thru link 72 (FIG. 13). These arms include jaws 70 (see FIG. 13) which are intended to engage the loosely fitting sheath 30 on the tang 22, grab the sheath and drive it inwardly onto the tang to the fullest extent possible without buckling. Therefore, the jaws 70 follow a closing motion where they come together and then an inwardly pushing motion by moving the mount 80 (or other connected portion) inwardly in a reciprocating action. A pivot 82 (FIG. 11) reciprocally releases the pinch rollers 60 after initial insertion onto the tangs 22, whereupon the jaws 70 finish the job of driving the sheath fully onto the tangs.

It is important that the jaw grip sufficiently engages the sheath (hence teeth) but not enough to close the opening in the sheath to inhibit insertion. In fact, the jaws change the shape of the tubing from having a round opening to oblong which is advantageous for finishing the insertion. If necessarily, it would be possible to provide a highly focused air jet into the mount (proximal opening) of the sheath as it approaches the tang to cause slight expansion thereof.

Figure 14:
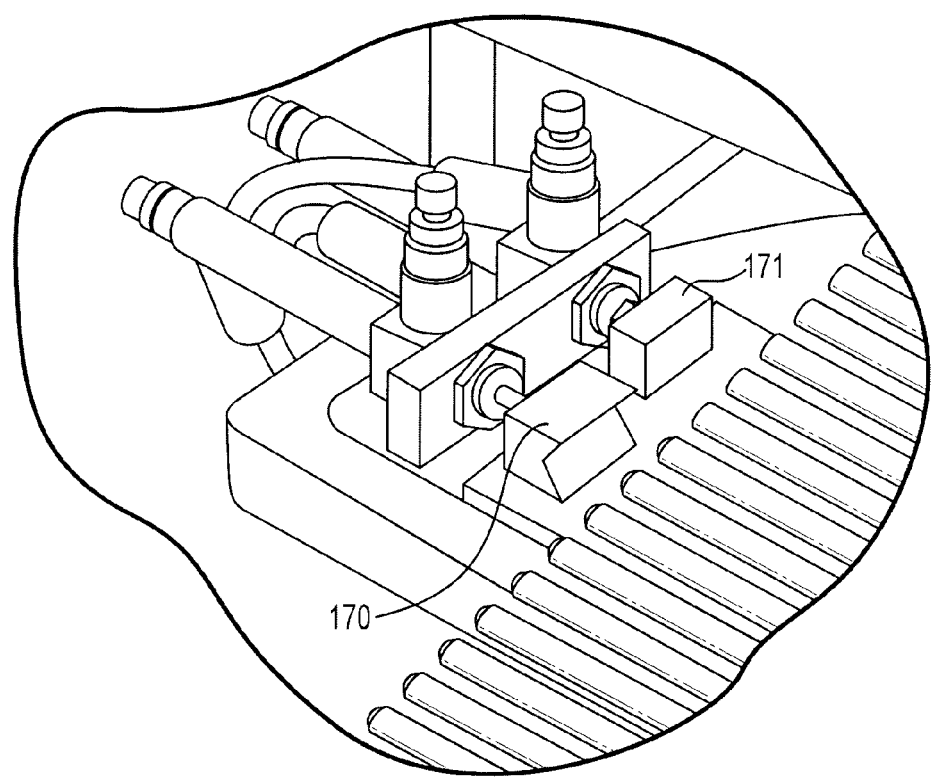
FIG. 14 is a perspective view of an alternate embodiment of the machine in FIG. 13.

There is an alternative way to drive the sheath onto the tangs as shown in FIG. 14. In this embodiment, instead of jaws 70, V-shaped pushers 170 are provided. In this embodiment insertion is a two-step motion. Pusher 171 has a blunt end and drives the sheath onto the tang. Completing the insertion requires a V-shaped or concave shaped head which can push the sheath further onto the tang. The V-shape engages the sheath but not the tang.

Figure 10:
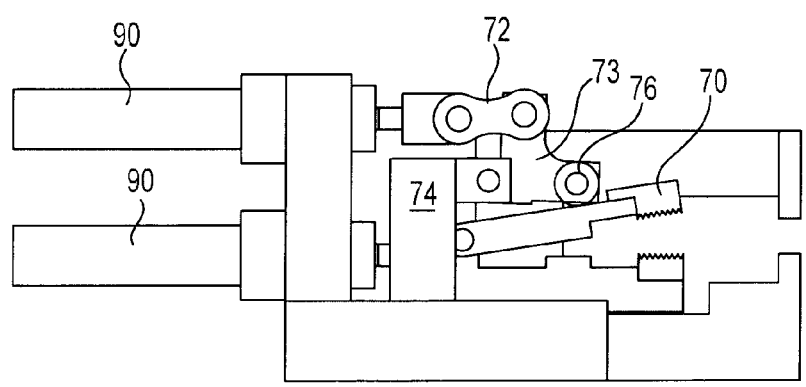
FIG. 10 is a side plan view of FIG. 9.

FIG. 10 shows the mechanics of the reciprocating motion of the jaws 70. Pneumatic cylinders 90 provide force on the link 72 which is pivotally connected to a three point link 73 which in turn is connected to a fixed body pivot point 74 and a pivot point on 76 on the jaws 70.

Figure 9:
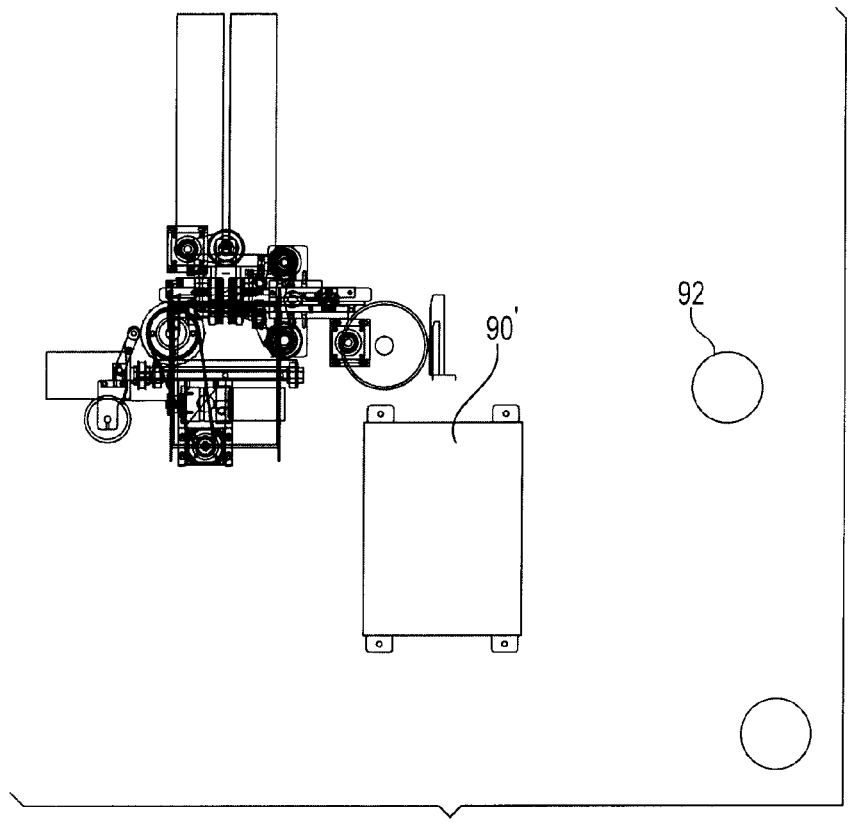
FIG. 9 is a top plan view of a sheath insertion machine.

FIG. 9 shows a heat channel 90' (90 prime) which provides a blast of heat to the heat shrinkable tubing 30 after being put on the tangs and then shrunk to a secure fit. A take up roll 92 collects the finished product onto a spool for slicing into individual units and applying the base material.

Final assembly onto base material 26 and then applying on to a file folder can be done by methods well known in the art of clasps not having this protective sheath.

Divider Embodiment

The sheath solution is less preferred for the special configuration used where a folder has an internal divider section which also has a pronged clasped. Such a divider is shown at www.smead.com as item 68025.

Internal divider sections are located between two outer covers (often with pronged clasps). They are often called classification folders. While it is possible to use the sheath covered solution above, it is known to provide a clasp structure which straddles the top of the divider section as shown in FIGS. 17-18.

Figure 15:
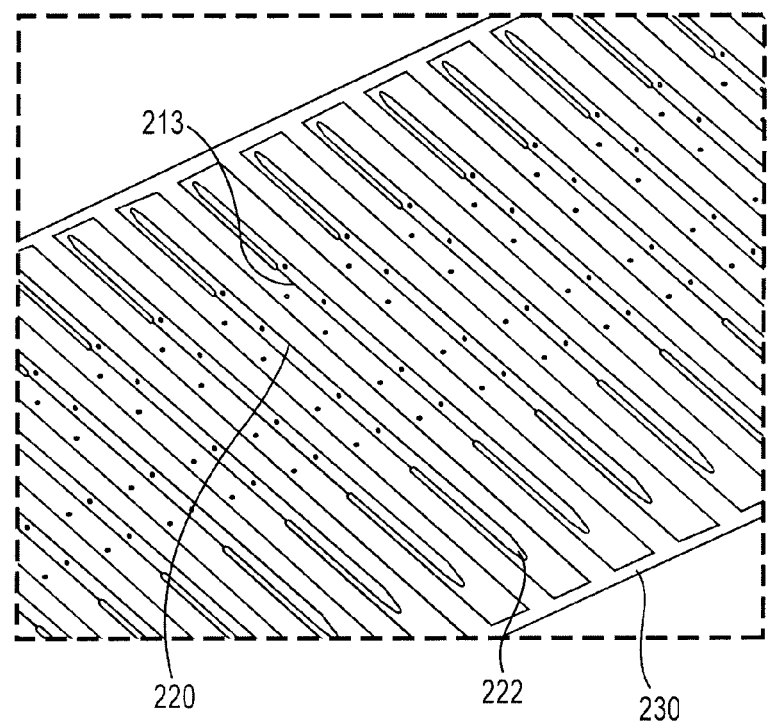
FIG. 15 is a perspective view of the plurality of divider style prong clasps in FIG. 8 illustrates.
Figure 16:
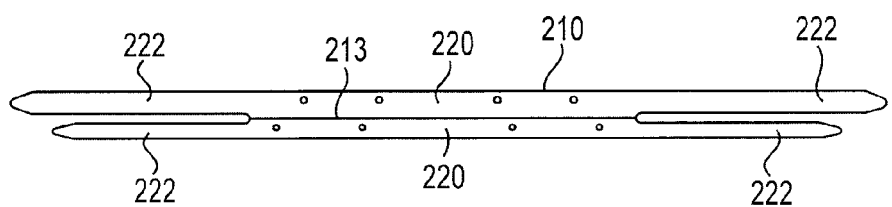
FIG. 16 is a top plan view of a single divider style prong clasp in FIG. 15.
Figure 17:
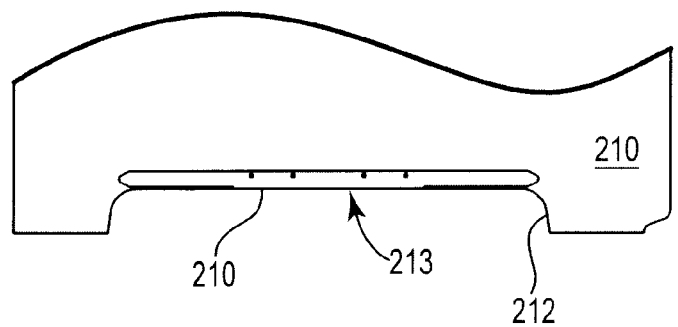
FIG. 17 a fragmentary plan view of a divider style prong clasp of FIG. 16 installed on one side of a divider.
Figure 18:
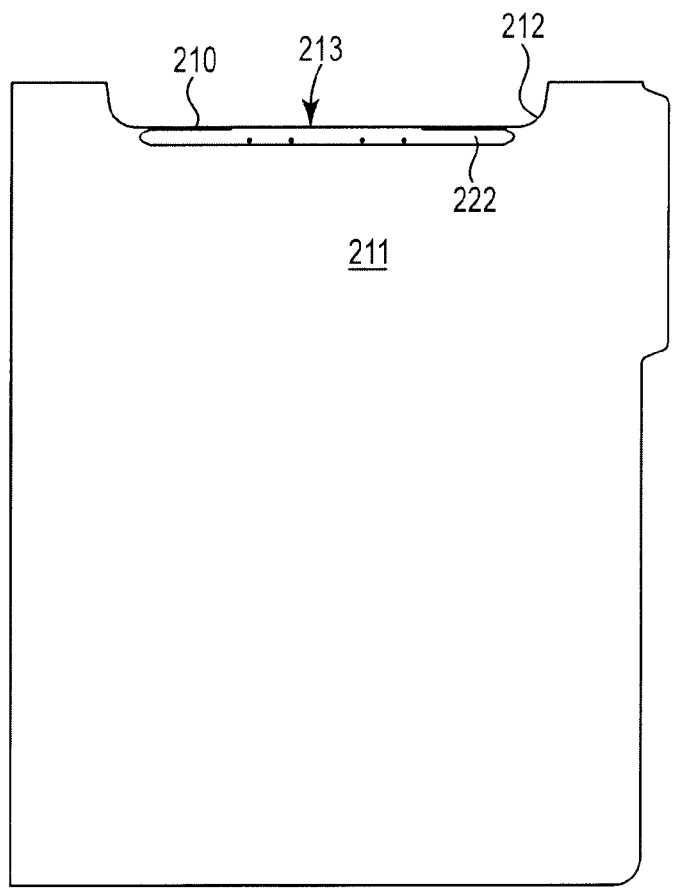
FIG. 18 is the other side of the divider shown in FIG. 17 shown in full view.

The divider 211 has two sides (FIG. 17 is a partial mirror image of FIG. 18). A recess is cut into the divider panel 211 such that the tangs 222 will be positioned appropriately for documents. Note: the clasp 210 straddles both sides of the divider by means of a link portion 213 between front and rear sides. FIGS. 15 and 16 also show these features.

FIG. 15 illustrates how a plurality of clasps 210 are chained together into a single spool.

In order to solve the problems of the prior art clasps as mentioned above, the framing connectors 230 (FIG. 15) needed to maintain the clasps on a roll. The connectors 230 will be cut out later.

The solution of the present invention in this embodiment is to overcoat the tangs and preferably the base section 220 with a protective coating which will remove all sharp edges and insure that the bending radius is increased, which will prevent kinking and metal fatigue.

Figure 19:
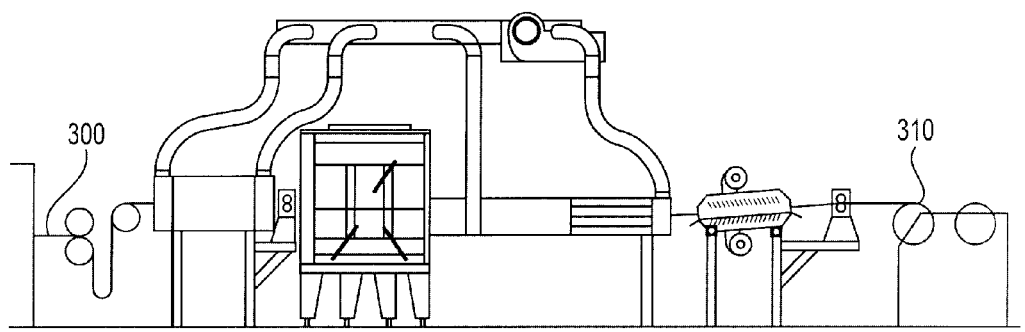
FIG. 19 is a schematic view of a powder coat production line.
Figure 20:
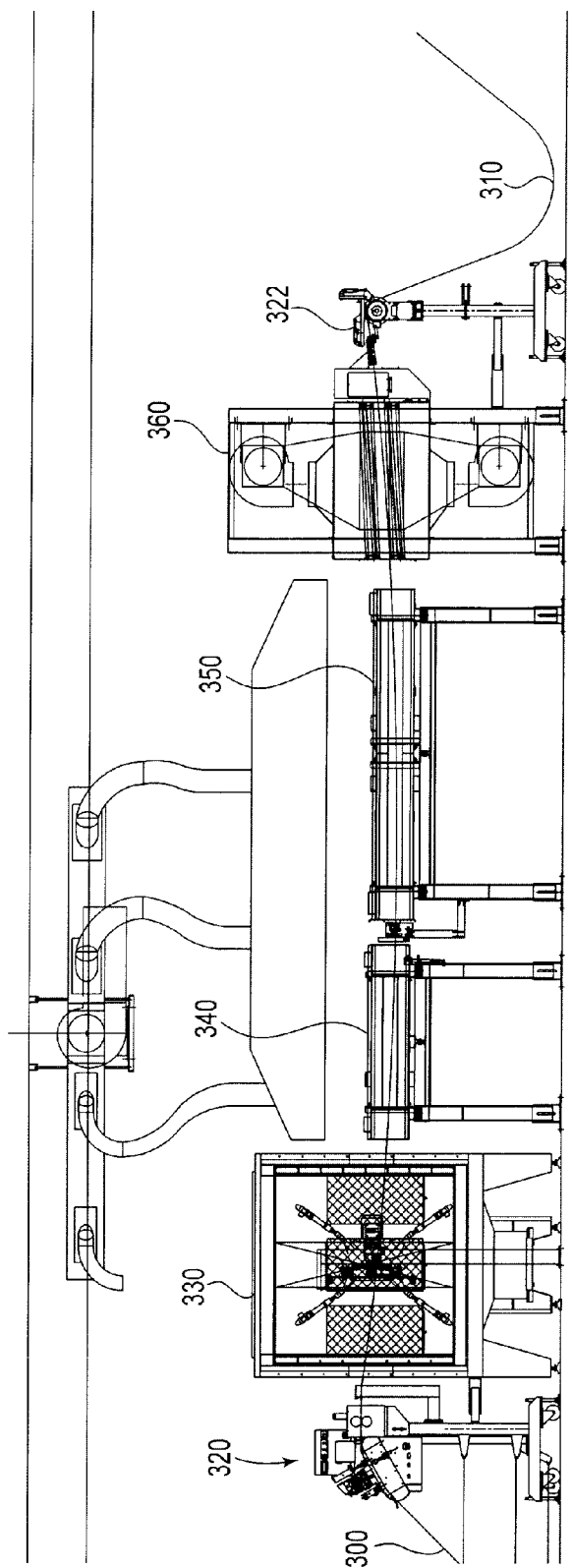
FIG. 20 is a close up view of a production line like FIG. 19.
Figure 21:
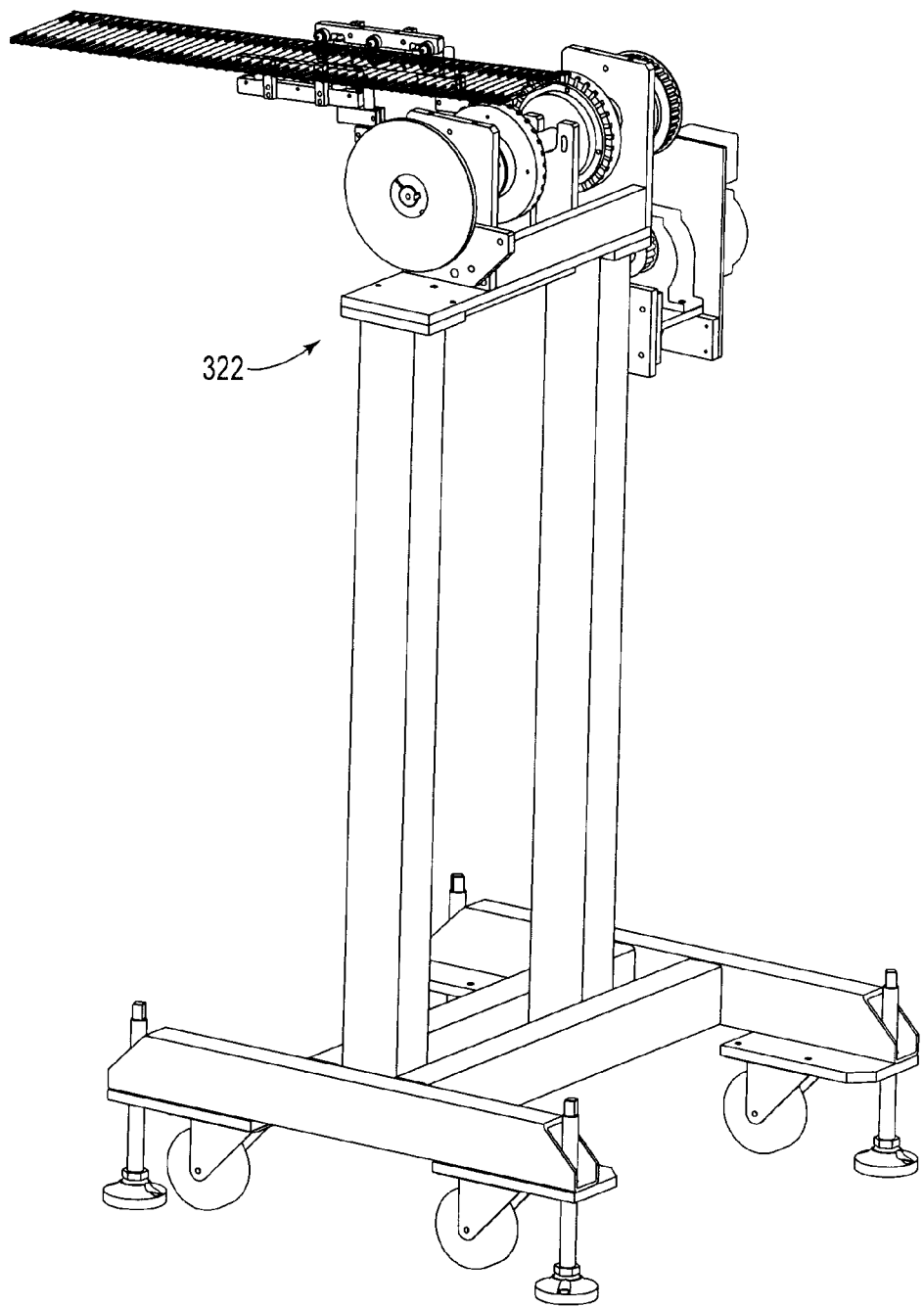
FIG. 21 is a close up perspective of a take up device for the production line.
Figure 22:
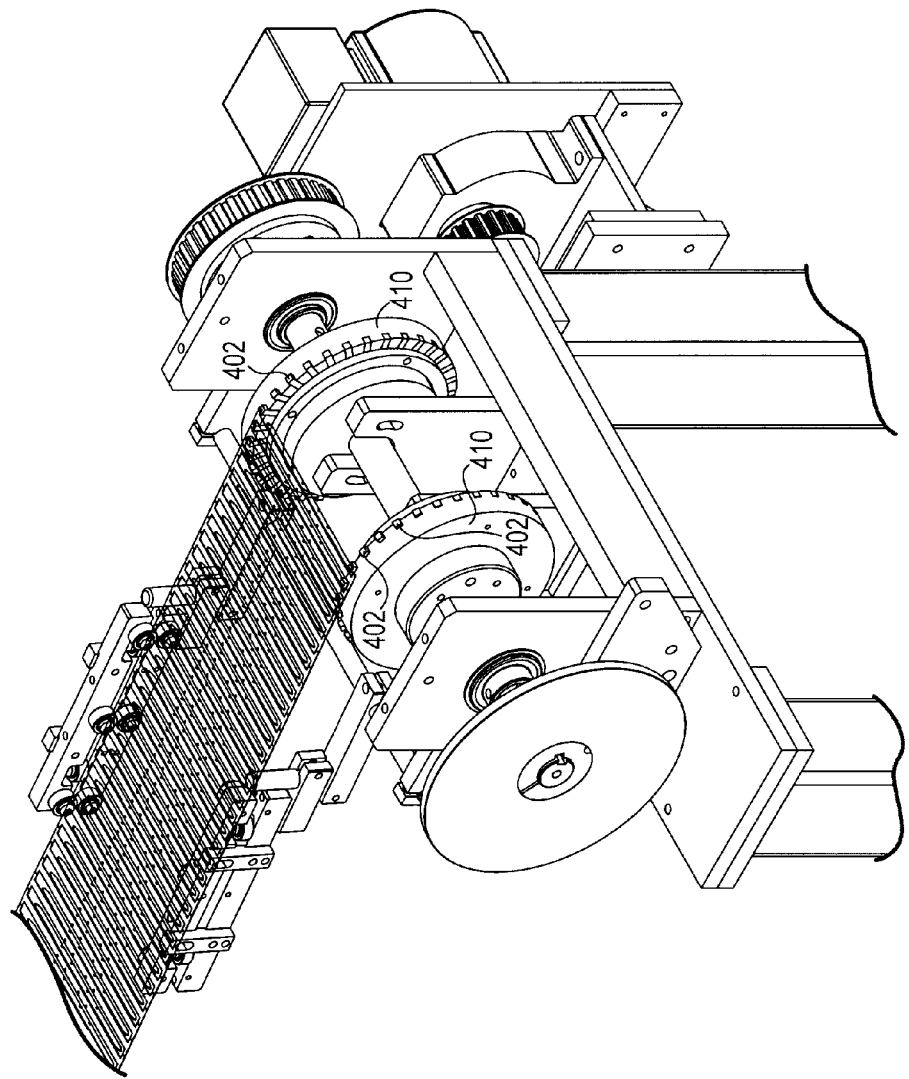
FIG. 22 is a close up perspective of the view in FIG. 21.
Figure 23:
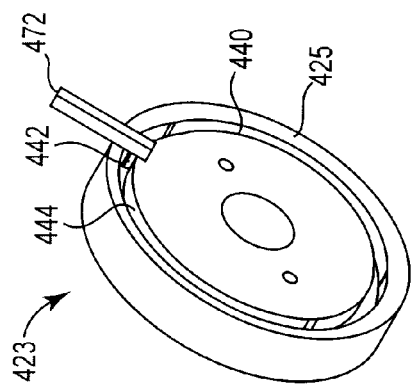
FIG. 23 is a close up fragmentary perspective of a cam drive tractor release system.
Figure 25:
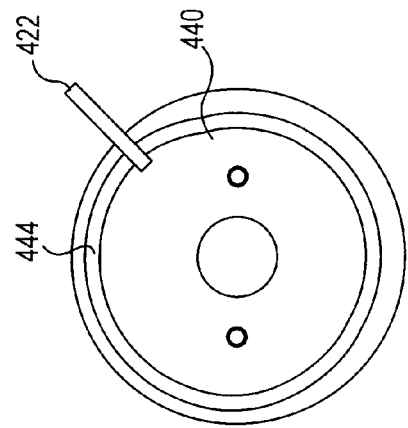
FIG. 25 is a front plan view of FIG. 23.
Figure 24:
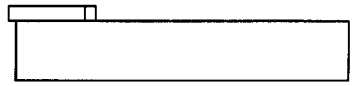
FIG. 24 is a side plan view of FIG. 23.

FIGS. 19 and 20 show a production line for purposes of overcoating the entire clasp stamping on roll with a plastic like power coating.

In preparation for power coating, it is desirable to bend the two clasps at their straddle point 213 so that the clasps are orthogonal to each other. This is shown is FIG. 15. If they are pre-bent 90 degrees, the flex required to bent a full 180 degrees (for attachment to the folder) will create less stress on the powder coat and it will be less likely to crack.

The pre-bending however creates difficulties in powder coating all of the prongs (there are typically 4 per unit), The powder coating is done electrostatically as well known in the art.

The system of powder coating is shown generally in FIG. 19 and in details in FIG. 20. A supply spool of stamped clasps 300 as shown in FIG. 15 travels along the line to a take up reel 310. Because powder coating is a complex mix of coating, time and speed of movement, it is important that the speed thru the line be tightly controlled. The first station is a tension station whose speed is electronically controlled with a like traction driver 322 on the other end of the line.

The clasps travel thru a powder booth where plastic powder sprayed only from underneath the line. This permits the bottom surfaces to be fully covered and the gravitational and electrostatic downward draw provides virtually identical coating on the upper side of the line. It also coats both sides of the 90 degree straddle bend.

From the powder booth 330, the line passes thru either a preheat oven 240 or simply a single oven 350 where the powder is evenly melted and then to a cooling station 360.

The final traction drive 322 must maintain the deflection of the line as it passes thru the oven so that it does not get too close or far from the heating elements.

Details of the take up tractor 322 are shown in FIGS. 21, 22, 23, 24, and 25. Tractor 322 has a series of pins 402 which engage openings in the clasp line. In order to get the line of clasps off the line and on a spool. To accomplish this, the take up tractor wheels 410 include a plurality of pins 402 which are retracted as the wheels rotate toward a take up. The objective is to remove the pins (sprockets) as the wheel rotates past top dead center toward a 90 degree rotation. It can be seen that the pins are fully retracted at 90 degrees.

This retraction is accomplished by a fixed cam (FIG. 25) which is configured so that it detracts the pins from top dead center 423 to the 90 degree pong 425. The pins 422 have a cam follower pin 442 which extends generally orthogonally to the pin 422 and rides in a track 440 which receives the cam follower pin. Therefore, by rotation of the pin around the cam surfaces in the cam track 440, will move the pin in and out of the exterior surface and thus retracting the sprockets at the right time to allow the clasp line to be released from the tractor and then on to a take up spool.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

We claim:

1. A method of making a protected file fastener having a pair of prongs having proximal and distal ends, comprising the steps of:
   a. cutting a length of heat shrinkable tubing from a supply of continuous tubing, said length having distal and proximal ends;
   b. providing a flow of air into an opening of the length of tubing to expand its distal open end;
   c. driving said length of tubing between a pair of rollers onto the proximal end of a prong;

d. with the length of tubing covering at least part of said prong, further gripping the proximal end of the tubing between a pair of jaws and further driving the tubing on to the prong until the distal end of the tubing reaches the distal end of the prong;

e. shrinking the length of tubing by applying heat to thereto.

2. The method of claim 1, wherein the step of gripping includes, providing a reciprocating pair of upper and lower jaw members each having teeth, and bringing said teeth close together and without releasing the jaws, driving the jaws toward the distal end of the prong, thereby driving the tubing further onto the prong.

3. The method of claim 1, wherein the cutting step includes cutting at least one end of the tubing to have a concave end cut.

4. The method of claim 1, wherein the cutting step includes cutting away a portion of one end of the tubing to create a concave end.

5. The method of claim 1, wherein said step of providing an air flow includes providing a jet of air to alter the cross sectional shape of the end of the tubing to create an oblong shaped opening sized to be better slid onto said prong without snagging, during insertion.

6. The method of claim 1, wherein the step of driving the tubing includes placing a pair of rollers adjacent each other with their circumferential edges touching, said rollers having a recess sized to receive said tubing, and rotating said rollers to drive said tubing onto a prong.

7. The method of claim 6, further including the step of separating said rollers after said tubing has been applied to said prong, so that no further driving force is applied to the tubing.

8. The method of claim 2, wherein the step of bringing said teeth close together includes connecting at least one jaw member to a pivotal link and reciprocatingly driving said link forward and backward, thereby causing said jaws to open and close.

9. The method of claim 2, wherein the step of bringing the teeth close together stops before the teeth can compress the tubing to the point where the opening in the tubing is too small to receive the prong.

10. The method of claim 1, wherein the step of gripping includes providing a reciprocating driver arm and driving said jaws, thereby driving the tubing further onto the prong and thereafter withdrawing the driver arm.

11. The method of claim 1, further including the step of providing a tapered prong with a wider portion at the distal end and narrower portion and tip at the proximal end.

12. A method of minimizing kinking of a bendable prong of a pronged fastener when said prong is bent, comprising the steps of:

a. increasing the bending radius of the prong by:

b. applying a length of heat shrinkable tubing, shorter than the prong length over the prong covering at least the portion of the prong to be bent;

c. heating the prong and tubing simultaneously to bond the tubing to the prong thereby increasing the bending radius of the prong and minimizing kinking.

\* \* \* \* \*